(12) United States Patent
Ben-Natan et al.

(10) Patent No.: US 10,642,876 B1
(45) Date of Patent: May 5, 2020

(54) QUERY PROCESSING PIPELINE FOR SEMI-STRUCTURED AND UNSTRUCTURED DATA

(71) Applicant: jSonar Inc., Lexington, MA (US)

(72) Inventors: Ron Ben-Natan, Lexington, MA (US); Ury Segal, Vancouver (CA)

(73) Assignee: JSonar Inc., Lexington, MA (US)

( * ) Notice: Subject to any disclaimer, the term of this patent is extended or adjusted under 35 U.S.C. 154(b) by 654 days.

(21) Appl. No.: 14/712,211

(22) Filed: May 14, 2015

Related U.S. Application Data (60) Provisional application No. 62/085,670, filed on Dec. 1, 2014.

(51) Int. Cl.
  *G06F 16/338* (2019.01)
  *G06F 16/951* (2019.01)
(52) U.S. Cl.
  CPC .......... *G06F 16/338* (2019.01); *G06F 16/951* (2019.01)
(58) Field of Classification Search
  CPC ......... G06F 17/30864; G06F 17/30867; G06F 17/30991; G06F 17/30696; G06F 16/338; G06F 16/951
  USPC ....................................................... 707/722
  See application file for complete search history.

(56) References Cited

U.S. PATENT DOCUMENTS

| 9,229,977 | B2 * | 1/2016 | Chadha | G06F 17/30536 |
| 2004/0044659 | A1 * | 3/2004 | Judd | G06F 17/3053 |
| 2004/0111388 | A1 * | 6/2004 | Boiscuvier | G06F 17/30908 |
| 2005/0222975 | A1 * | 10/2005 | Nayak | G06F 17/30613 |
| 2006/0206466 | A1 * | 9/2006 | Boiscuvier | G06F 17/30908 |
| 2008/0114724 | A1 * | 5/2008 | Indeck | G06F 17/30595 |
| 2008/0183688 | A1 * | 7/2008 | Chamdani | G06F 17/30442 |
| 2012/0290564 | A1 * | 11/2012 | Mok | G06F 17/30554 707/722 |
| 2014/0095505 | A1 * | 4/2014 | Blanchflower | G06F 17/30091 707/737 |
| 2016/0328470 | A1 * | 11/2016 | Indeck | G06F 17/30595 |

* cited by examiner

*Primary Examiner* — Michael Pham
(74) *Attorney, Agent, or Firm* — Armis IP Law, LLC (57) ABSTRACT

A query server performs method of generating a query result using an aggregation pipeline by identifying, based on a query, a sequence of operations to be applied to documents from an unstructured database, in which a portion of the operations are dependent on other operations in the sequence of operations. The pipeline determines, from the operations, lightweight and heavyweight operations, in which the heavyweight operations generate a materialized result have a substantial impact on processing resources. The pipeline defers the lightweight operations until a materialized result is needed, for performing with a corresponding heavyweight operation, in which the materialized result includes either creation of a new document or movement of substantial data from a document. Lightweight operations are grouped with heavyweight operations such that multiple operations can be collapsed into a single operation that act upon the data together thus avoiding the number of materializations.

20 Claims, 5 Drawing Sheets

```
                    ┌─ 132
{
name : " ",   ──── 132-A address : " ";   ──── 132-B role {   ──── 132-C occupation : " ";   ──── 132-CD rate : 123;   ──── 132-CE
    }

Location : " "   ──── 132-F

| | | |
|---|---|---|
| Filter | Location = "MA" and role.occupation = "Engineer" | ──── 170-1 |
| Project | Name, Rate | ──── 170-2 |
| Group | Avg (Rate) | ──── 170-3 |
| Sort | Name | ──── 170-4 |
| Render | Name, Rate, Avg (Rate) | ──── 170-5 |

FIG. 3b

IDENTIFY, BASED ON A QUERY, A SEQUENCE OF OPERATIONS TO BE APPLIED TO DOCUMENTS FROM AN UNSTRUCTURED DATABASE, A PORTION OF THE OPERATIONS DEPENDENT ON OTHER OPERATIONS IN THE SEQUENCE OF OPERATIONS
200

EACH OPERATION DEFINES ONE OR MORE INSTRUCTIONS FOR PERFORMANCE BY A PROCESSOR FROM A PLURALITY OF PROCESSORS, FURTHER COMPRISING SELECTING, FOR EACH DOCUMENT TO WHICH THE OPERATION IS DIRECTED, A PROCESSOR FOR PERFORMING THE DEFINED INSTRUCTIONS ON THE DOCUMENT
201

DETERMINE, FROM THE OPERATIONS, HEAVYWEIGHT OPERATIONS HAVING A SUBSTANTIAL IMPACT ON PROCESSING RECOURCES
202

OPERATIONS FURTHER INCLUDE LIGHTWEIGHT OPERATIONS, THE HEAVYWEIGHT OPERATIONS HAVING A GREATER IMPACT ON PROCESSING RESOURCES THAN THE LIGHTWEIGHT OPERATIONS
203

EACH OPERATION IN THE SEQUENCE OF OPERATIONS CORRESPONDS TO A STAGE OF A PIPELINE, EACH STAGE DEFINING AN OPERATION PERFORMED ON A DOCUMENT
204

QUERY PROCESSING PIPELINE FOR SEMI-STRUCTURED AND UNSTRUCTURED DATA

RELATED APPLICATIONS

This patent application claims the benefit under 35 U.S.C. § 119(e) of U.S. Provisional Patent App. No. 62/085,670, filed Dec. 1, 2014, entitled "METHODS FOR EFFICIENT PARALLEL AGGREGATION PIPELINE PROCESSING," incorporated by reference in entirety.

The patent application is related to copending U.S. patent application Ser. No. 14/276,135, filed May 13, 2014, entitled "PROCESSOR FOR DATABASE ANALYSIS PROCESSING", incorporated by reference in entirety.

BACKGROUND

Unstructured databases are becoming a popular alternative to conventional relational databases due to the relaxed format for data storage and the wider range of data structures that may be stored. In contrast to conventional relational databases, where strong typing imposes data constraints to adhere to a predetermined row and column format, unstructured databases impose no such restrictions.

Modern proliferation of data generation for massive quantities of data as well as processing capability to handle large datasets has caused new forms of databases to emerge. These databases differ in many aspects and they are collectively called NoSQL databases (that stands for Not-Only-SQL). What is common in most of these databases is that the data stored within is not confined to a strict structure/schema—hence these databases are sometimes called schema-less or flexible-schema, or unstructured. Some of these documents represent data as a set of documents where each document can have the same structure or different structure as other documents in the collection.

Since such unstructured databases have no formal field or record structure, they may be more accurately characterized as a collection of facts. Unlike their structured counterparts, typically a SQL (Structured Query Language) database, which denotes data in fixed length fields enumerated in records in a tabular form, an unstructured database labels fields for storing values in a document. A set of documents defines a collection, in which the documents in a collection may share some, none, or all of a particular field.

SUMMARY

A query server performs a method of generating a query result using an aggregation pipeline by identifying, based on a query, a sequence of operations to be applied to documents from an unstructured database, in which a portion of the operations are dependent on other operations in the sequence of operations. The pipeline determines, from the operations, heavyweight operations based on the dependencies, in which the heavyweight operations have a substantial impact on processing resources. The pipeline defers the heavyweight operations until a materialized result is needed, in which the materialized result is defined by either creation of a new document or movement of substantial data from a document. In general, the heavyweight operations require a materialized result and may need to wait for other pipelines to complete similar stages (dependency) or may need to create documents or instantiate memory for each document processed. The pipeline completes the deferred operations only after performing the other operations, from the sequence of operations that the heavyweight operations depend on, in effect pushing each document through as many stages in the pipeline as possible before waiting for other pipelines to "catch up," usually by a needed materialized result.

Configurations herein are based, in part, on the observation that the availability of vast amounts of unstructured data can cause extreme processing times. Unfortunately, conventional approaches suffer from the shortcoming that processing of unstructured databases may sequentially process each of documents in a collection, requiring intermediate storage or allocation of memory or documents to store results from all documents prior to rendering a result. Accordingly, configurations herein substantially overcome the above described shortcomings by allowing a data set, typically a document or set of document, to progress along the pipeline independently until needing to produce a materialized result. A materialized result requires allocation of memory and/or creation of additional documents, or has dependencies on the results of other pipelines/processors (such as a sort). Operations requiring materialization are referred to as "heavyweight" operations because they significantly impact processing resources, characterized by operations that create or instantiate memory or documents as a function of the number of source documents, which can be substantial for collections having a large number of source documents. Particularly expensive in terms of processing are operations which impose a polynomial (or more) function of the number of documents for the processing required. For example, an operation that increases in processing demand by the square of the number of documents. Computability experts refer to this type of result an $O(n^2)$ (or other polynomial value). Specifically, only groups, output stages and sorts need "terminate" a process and actually materialize anything. Filters, projections, flattening etc. can compute a document and take it through the next pipeline stage. These "lightweight" operations generally operate on pointers or references to the document and can pass from one stage to the next without copying or moving entire documents.

The disclosed query server for an unstructured database provides methods for processing documents through an aggregation pipeline. The methods focus on both reducing processing time as well as increasing throughput (and combinations of these goals). The disclosed methods allow such pipelines to be run in short time on small, commodity hardware even for so-called "Big Data" scale—e.g. billions of documents.

The aggregation pipeline disclosed further below depicts is a sequence of steps or stages, each of which does a simple transformation of the source data and produces a result which becomes the input to the next stage in the pipeline. A pipeline approach is applied to a collection of data that acts as the input to the first stage in the pipeline. The result of the pipeline is the output of the last stage in the pipeline. From a sequence of operations, heavyweight and lightweight operations appear in a particular order. In the pipeline, operations corresponding to a materialized result (the "heavyweight" operations) are identified. An optimizer or sequencer identifies each of the heavyweight operations, and examines the lightweight operations ordered near the heavyweight operations. Lightweight operations are advanced or deferred to an adjacent heavyweight operation when the lightweight operation can be completed during the heavyweight operation, meaning that the lightweight operation can be performed on the same document or set of documents in memory without an intervening materialized result. An indicator, flag or bit may be designated with respect to the heavyweight operation to identify the lightweight operation or operations that are to occur simultaneously (without intervening materialization). For example, during a sort (heavyweight) operation, all document need to be examined, possibly multiple times. An adjacent projection or filter operation can be applied at the time of examining the document for the sort operation, rather than performing the projection or filter prior to or after the sort, which would involve creating new output sets with the results of the projection (subset of fields) or filter (subset of documents).

Hardware pipelining became a popular term in the 1980s as computer manufacturers began making processors that could operate on several instructions simultaneously. Such architectures recognized that an opcode, or machine instruction corresponding to a single processor word (typically 16, 32 or 64 bits) could be defined with different fields, such that the processor could operate on different fields of consecutive instructions. So-called "pipelined" architectures subdivided an opcode into multiple bit fields, and the processor pipeline would operate on different subfields of each opcode, while also operating on other subfields of the adjacent instructions. Such conventional approaches differ because they concern only a single processor and instruction stream, and operate on a single machine opcode. Configurations herein define operations, each including one or more instructions, and for simultaneous processing by parallel processors. There is no subdivision of individual opcodes occurs into bit fields.

Alternate configurations of the invention include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a C++ executable or a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs), Graphic Processing Units (GPUSs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Document-based, unstructured, NoSQL databases maintain data as documents, typically as either JSON documents or XML documents. A set of documents are maintained within a collection. A server maintains an interface and array of pipelined processors for receiving an unstructured data set having a large collection of documents. The pipeline includes multiple stages, each corresponding to a particular type of operation, and each operation invoking one or more instructions to produce the result of that stage.

Each stage in the pipeline may employ one or more of the following actions:

Multi-core processing of pipeline steps—Since each step performs the same action and the input is usually a very large number of documents (especially for the early stages of the pipeline), and because many of the stage types operate on one document at a time (e.g. projection, flatten, filter), multiple processors, cores and threads can all do the same action on different parts of the collection to parallelize processing and shorten overall times. The server identifies multi-core processors, SIMD capabilities and GPUs when available.

Pre-fetch of source data—Each thread described above processes many millions of documents at a time. In order for a thread not to wait idle to process the next chunk containing millions of documents, a separate set of threads pre-fetch the data from disk and make it available in-memory for processing when the threads complete the previous chunks.

Efficient use of hash tables—typically, performance in almost all stages work better when using very fast hash tables. This is especially true for grouping when we need to compute "buckets" and compute aggregation functions, and for joins, when we need to match-up documents from the input collection to documents in a joined collection.

Deferred materialization of results—Perhaps the most important method of all is that of late materialization. It is often not necessary to actually compute the output of each stage before taking the document to the next stage. Instead, documents are taken through the pipeline as much as we can. Specifically, only groups, output stages and sorts need "terminate" a process and actually materialize anything. Filters, projections, flattening etc. can compute a document and take it through the next pipeline stage. The ability to not write to disk or even allocate much memory until absolutely required, and the fact that some "terminations" (e.g. groupings) often cause orders of magnitude reduction in the number of documents is what make this optimization the most important one.

Pipeline optimizations—it has been observed that very often the order of stages can be changed to account for more efficient processing of the pipeline. For example, filter stages can be moved earlier in the pipeline. As another example, a join stage and a group stage can be processed together at the same time and shorten processing time. The same is true for an unwind stage and a match stage—the two can be processed together rather than one after the other. In fact, the more "collapse" happens the more efficient the processing is since it is attempted to always to avoid materialization of interim results.

Use of ranges and text indexes to avoid unnecessary processing of data—Since the pipelines operate on very large sets of data, various indexing methods are invoked to mark blocks of data with ranges and with other indexing methods (e.g. text indexes, bloom filters, etc.) These indexing structures help decide when to skip over a block of data completely and never bother processing it. This is possible also because of the pre-fetch and the pipeline optimization (reordering of stages) described above.

Use of columnar data—Data is stored in columnar format on-disk, such that each named fields is maintained with other like named fields. Projections and groupings often require only reading of small subsets of the total data.

Figure 1:
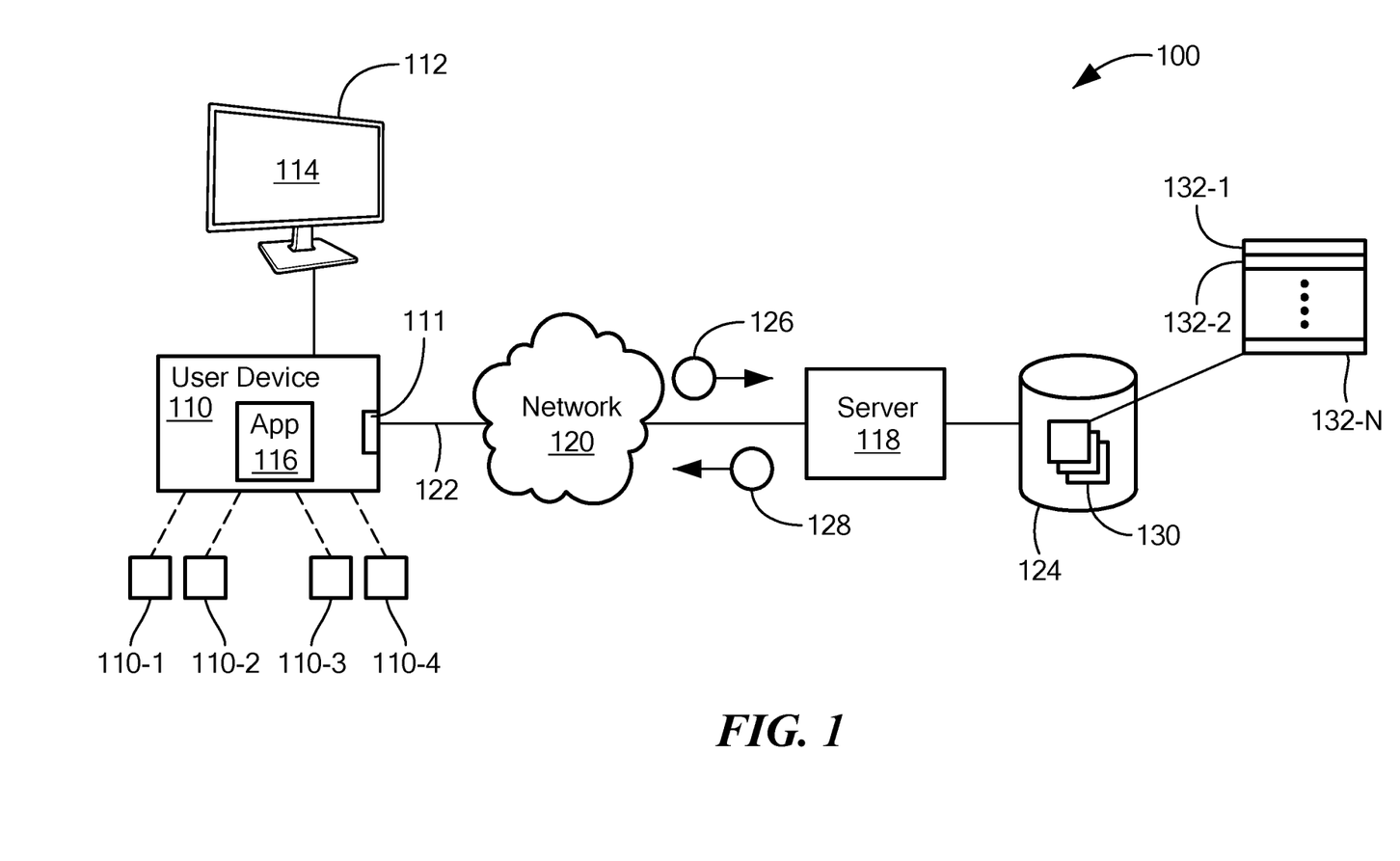
FIG. 1 is a context diagram of a computing environment suitable for use with configurations disclosed herein.

FIG. 1 is a context diagram of a computing environment suitable for use with configurations disclosed herein. The configuration of FIG. 1 shows an example arrangement of computing devices for practicing the principles discussed herein, however any suitable network or local computer platform will suffice. Referring to FIG. 1, a user computing device 110 includes a visual display 112 for rendering a browser or other visual medium, an I/O (Input/Output) interface 111, and an application processor for launching and executing an application 116 for user queries and responses. The visual display 112 present a graphical user interface (GUI) 114 for user interaction, and receives input from a user and renders responses to user queries, as discussed further below. Any appropriate device may be employed, such as mobile devices 110-1 (smartphones, tablets), laptops 110-2, desktops 110-3, or other computing device 110-4 suitable for user interaction, rendering and Internet connectivity. The application 116 interacts with a query server 150, which may be accessible via a public access network 120 such as the Internet. The query server 150 employs one or more network links 122, for accessing a database 124 having unstructured data stored in collections 130. Each collection includes a number of documents 132-1 . . . 132-n (132 generally). Using operations and methods disclosed further below, the application 116 issues a query request 126 from the user, and invokes the servers 150 for generating a result 128 for rendering on the display 112. Each processor 152 includes accessible memory 168, which may be shared by other processors, and which may vary in terms of access speed and size, as disclosed in the copending application cited above.

Operations are therefore ordered and assigned to stages in the pipeline, such that the heavyweight operations defined the stages and the lightweight operations are assigned or grouped with the heavyweight operations. In contrast to conventional pipelines, where the processor operations are fixed at particular stages in the pipeline as data moves through the stage, the claimed approach performs stages based on a corresponding heavyweight operation, and assigns or orders the lightweight operations to the stages by moving lightweight operations forward or backward in the pipeline for performance along with the heavyweight operations with which they are grouped.

Figure 2:
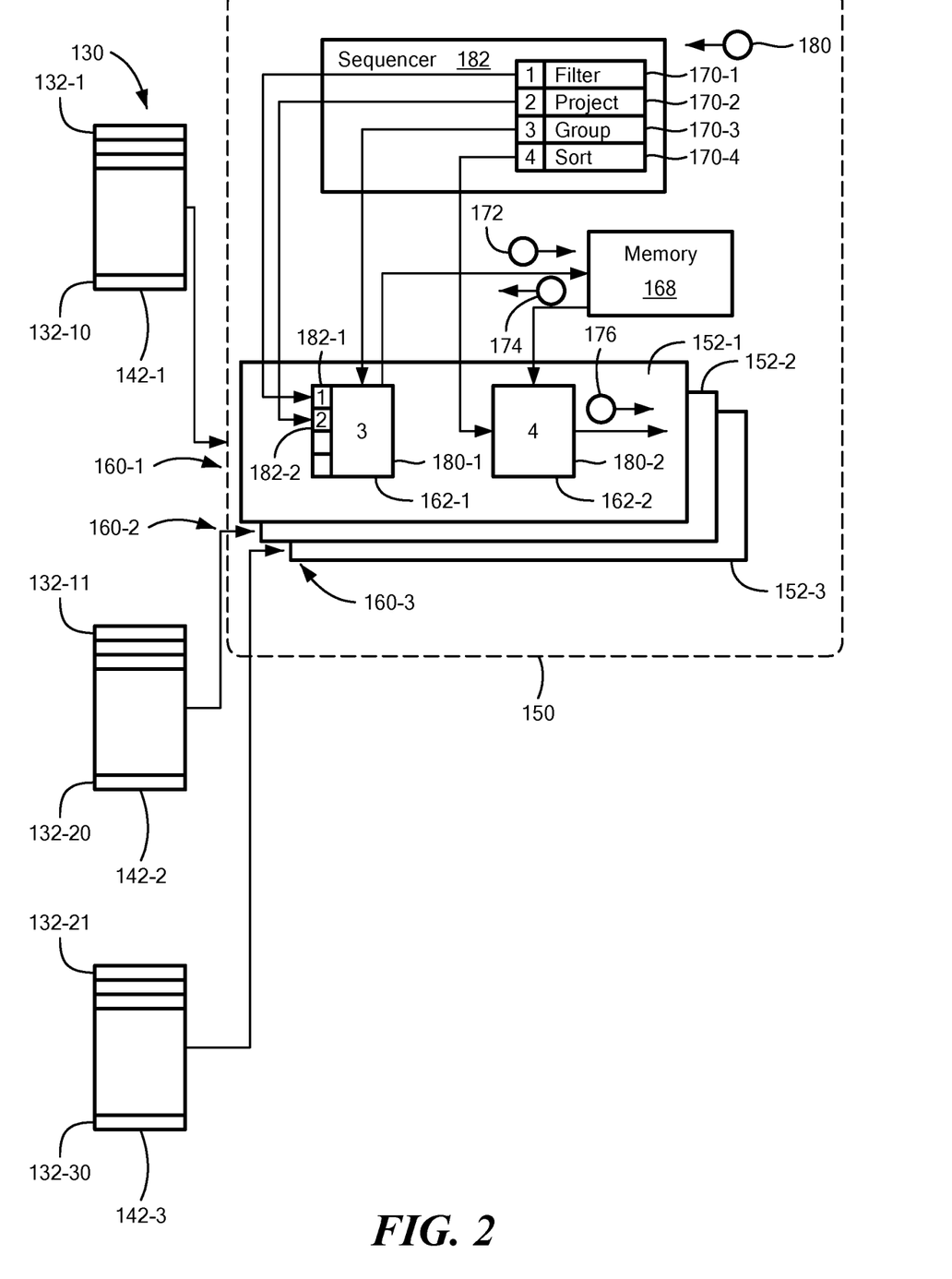
FIG. 2 is a diagram of a pipeline architecture in the environment of FIG. 1.

FIG. 2 is a diagram of a pipeline architecture in the environment of FIG. 1. Referring to FIGS. 1 and 2, a processing server 150 includes an arrangement of parallel processors 152, typically split across multiple machines, blades or similar parallel environment. In the example configuration such a parallel environment includes a plurality of processors 152-1 . . . 152-3 (152 generally), shown as contained in a single processing server 150, but which may take any suitable arrangement of physical servers and processors. Each processor 152 performs a pipeline 160-1 . . . 160-3 (160 generally) corresponding to the sequence of operations that the processor 160 is adapted to perform. Each pipeline 160 includes a series of stages 162-1 . . . 162-N (162 generally, two stages shown) corresponding to an ordered series of operations that the pipeline 160 performs. The number of stages 162 may vary to suit the expected queries, and not every query will require every stage. In general, the output of each stage 162-($m$) becomes the input to the successive stage 162-($m$+1).

Each stage 162 in the pipeline 160 performs an operation by executing instructions included in the operation for effecting a certain action. These are the primitives that form all pipelines and the ability to perform any query or transformation is a result of the fact that these primitives can be assembled in any way. Each stage has one of the following types:

A filter stage defines conditionals. Each document 132 in the input is checked by these conditionals to determine if it is copied as-is to the output or omitted from the output.

A projection stage transforms fields in the input document when copying to the output document. It can omit fields, create new fields (e.g. computed values from the input fields), change names of fields etc.

A group or aggregation stage groups multiple documents from the input into a single document in the output. The stage defines how to group documents together and what kind of aggregation computations should be computed from the multiple input documents being grouped into the single document (e.g. avg, sum, etc.)—note that this should not be confused with grouping of lightweight operations to corresponding heavyweight operations as discussed above.

A flatten (also called unwind) stage takes a field of an array type and flattens it to create multiple documents—one per array element.

A join stage takes a document from the input and creates new documents that become part of the output by joining the input document with documents in another collection. Each document in the input can create zero, one or many join documents to the output depending on the joined collection and on the join conditions.

A sort sorts the documents according to some criteria.

Figure 3A:
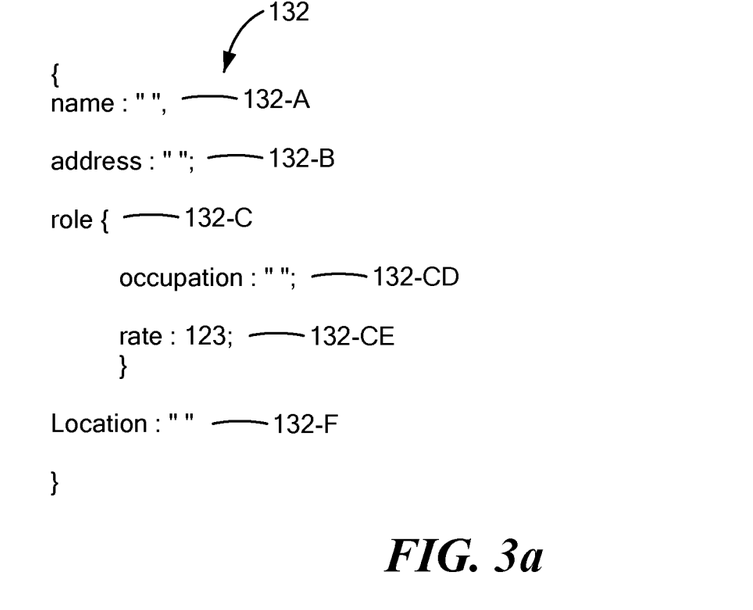
FIG. 3a is a diagram of an example document operable by the pipeline of FIG. 2.
Figure 3B:
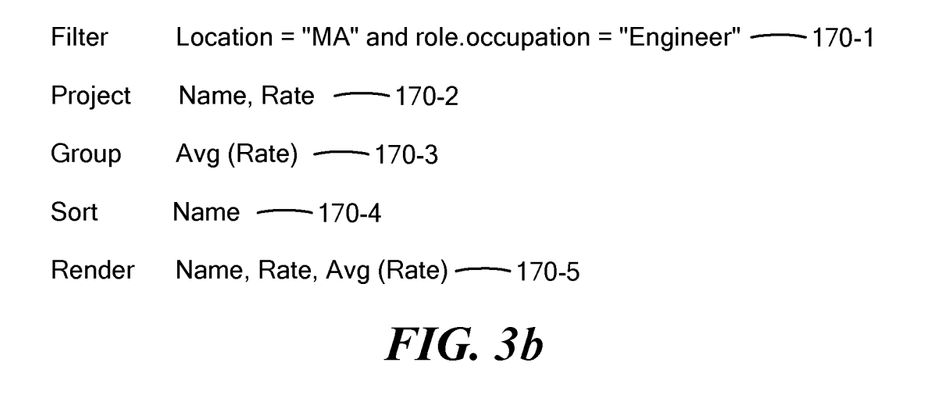
FIG. 3b is a diagram of operations and instructions using the document of FIG. 3a in the pipeline of FIG. 2.

FIG. 3a is a diagram of an example document operable by the pipeline of FIG. 2, and FIG. 3b is a diagram of operations and instructions using the document of FIG. 3a in the pipeline of FIG. 2. In FIG. 3a, a document 132 stores employees of a company, and includes a name field 132-A, and address field 132-B, a subdocument 132-C having fields occupation 132-CD and rate 132-CE, and a location field 132F (note that other fields may also be included, but for purposes of the example only the listed fields are needed).

FIG. 3b is an example of the query 180 received by the sequencer 182 in FIG. 2, illustrating the syntax of each of the operations 170 for generating a list, consulting/pay rate and average rate of engineers in MA, and for displaying/rendering the results on an applicable rendering device (170-5).

Referring to FIGS. 2, 3a and 3b, an example query 180 is received by a sequencer 182 in the server 150 to generate a list of names, pay rate, and average rate of all engineers in Massachusetts using a document collection 130. In the multi-processor architecture of the server 150, each processor 152 (and corresponding pipeline 160) receives a portion or chunk 142-1 . . . 142-3 (142 generally) of the documents 132 in the collection 130. The example depicts sets of 10 documents; in practice the number of documents would be orders of magnitude larger. A first portion of documents 132-1 . . . 132-10 is handled by the pipeline 160-1 and will suffice as an example; the other pipelines 160 receive similar portions.

The sequencer 182 parses or scans the query 180 to identify the operations 170. Operations 170 are categorized as either heavyweight for operations which require a materialized result and lightweight for operations which need not materialize a result. It should be emphasized that any operation may produce a materialized result, meaning allocating a new collection as an output document, to server as input to a successive stage in the pipeline, but configurations herein identify the operations where a materialized result can be avoided. Rather, the operation is deferred or advanced such that it is grouped with another operation that does require a materialized result.

The disclosed method of generating a query result, therefore, includes identifying, based on a query, a sequence of operations 170 to be applied to documents 132 from an unstructured database collection 130. The sequencer 182 then determines, from the operations in the sequence of operations, heavyweight operations having a substantial impact on processing resources, in which the remaining operations are lightweight operations, and defers or advances the lightweight operations in the sequence until a materialized result is needed from invocation of one of the determined heavyweight operations, such that the materialized result is defined by at least one of creation of a new document, moving data in at least a portion of a document, or other allocation of memory requiring a separate allocation of output for each input document to define a result as input for the next stage 162.

Ordering of operations may be based on dependencies which result from a need to examine a materialized result from other processors, such as in a sort or average, or by utilizing the result of a previous query operation. For example, a filter operation typically reduces the number of documents, so while not a strict dependency, it is beneficial to perform filtering early to reduce the number of documents that need be considered by successive operations. In contrast, if the filter is based on a condition, such as all documents above an average value, it may be necessary to computer the average across all documents prior to filtering.

The sequencer 182 assigns or schedules the operations 170 in the pipeline 160 for completing the deferred or advanced operations 170 when generating the materialized result of one of the heavyweight operations 170. In the example of FIG. 2, deferring or advancing the operations includes determining, for the heavyweight operations, lightweight operations to group with the heavyweight operations, and performing the grouped lightweight operations with the heavyweight operations. The sequencer 182 attempts to order the operations such that multiple operations operate on the same document 132 for generating a single materialized result from the multiple operations. Referring to FIG. 2, the sequencer identifies four operations 170-1 . . . 170-4 in the query 180. Sort and group (170-3 and 170-4) are heavyweight operations that require a materialized result. Sort requires examination of the documents of other pipelines, and involves writing a sort result 172 to the memory 168. The average pay rate requires a group operation 170-3, and receives as input 174 the rate 132-CE field of all documents from the memory. The result 176 including the sorted name and rate along with the average rate is sent for rendering to a user via instruction 170-5, generally amounting to displaying the materialized result of operation 170-4.

The sequencer 182 makes decisions about which lightweight operations (170-1, 170-2) can be performed with which heavyweight operations. The sequencer 182 groups the deferred or advanced operations by, for each lightweight operation (170-1, 170-2) in the sequence of operations, identifying a heavyweight operation (170-3, 170-4) to group the lightweight operation with. To group the operations, the sequencer defines a pipeline entry 180-1 . . . 180-2 (180 generally) corresponding to the heavyweight operation, and assigns a pipeline entry for the lightweight operation 182-1 . . . 182-2 (182 generally) to a corresponding heavyweight operation 180. In the example of FIG. 2, the filter 170-1 operation and project 170-2 operation are defined as lightweight pipeline entries 182-1 and 182-2 grouped or associated with the Group operation entry 180-3 (Again, it may be helpful to distinguish the grouping or association of heavyweight and lightweight operations with the mnemonic label for the heavyweight Group operation). Since the filtering and projection operations merely require examining fields and passing through certain subset of fields, these operations can be performed at the time that the Group operation 170-3 is examining documents. Lightweight operations can be assigned or grouped forwards or backwards with the heavyweight operations by defining a lightweight pipeline entry 182 corresponding to a heavyweight pipeline entry 180 with which it is grouped.

In the example configuration, performing the assigned lightweight operation includes setting an indicator, flag or other marker corresponding to the grouped lightweight operation and the corresponding heavyweight operation, such as the lightweight pipeline entries 182, and examining the indicator during performance of the heavyweight operation on a document 132. At the time of writing a materialized (output) result for the heavyweight operation, the processor 152 also performs, based on the indicator, the grouped lightweight operation on the document before performing the heavyweight operation on other documents 132 in the collection. The grouping therefore creates lightweight pipeline entries 182 that point to or reference the sequenced (deferred or advanced) operations for completion during materialization of the result for the corresponding heavyweight operation. Grouping therefore identifies when multiple operations can be collapsed into a single operation that act upon the data together.

Depending on the dependencies, selecting the grouped operations may include determining if a lightweight operation has a dependency on an output of a heavyweight operation, and performing the lightweight operation subsequent to a heavyweight operation on which it depends, as in the above example for comparing an average. For many queries, however, the operations 170 are unitary in that they can be performed atomically on a single document, without a need to store a result and reference other documents, such as filtering (a Boolean result of inclusion) or projection (including a subset of fields, and therefore simply truncating the unneeded fields)

Figure 4A:
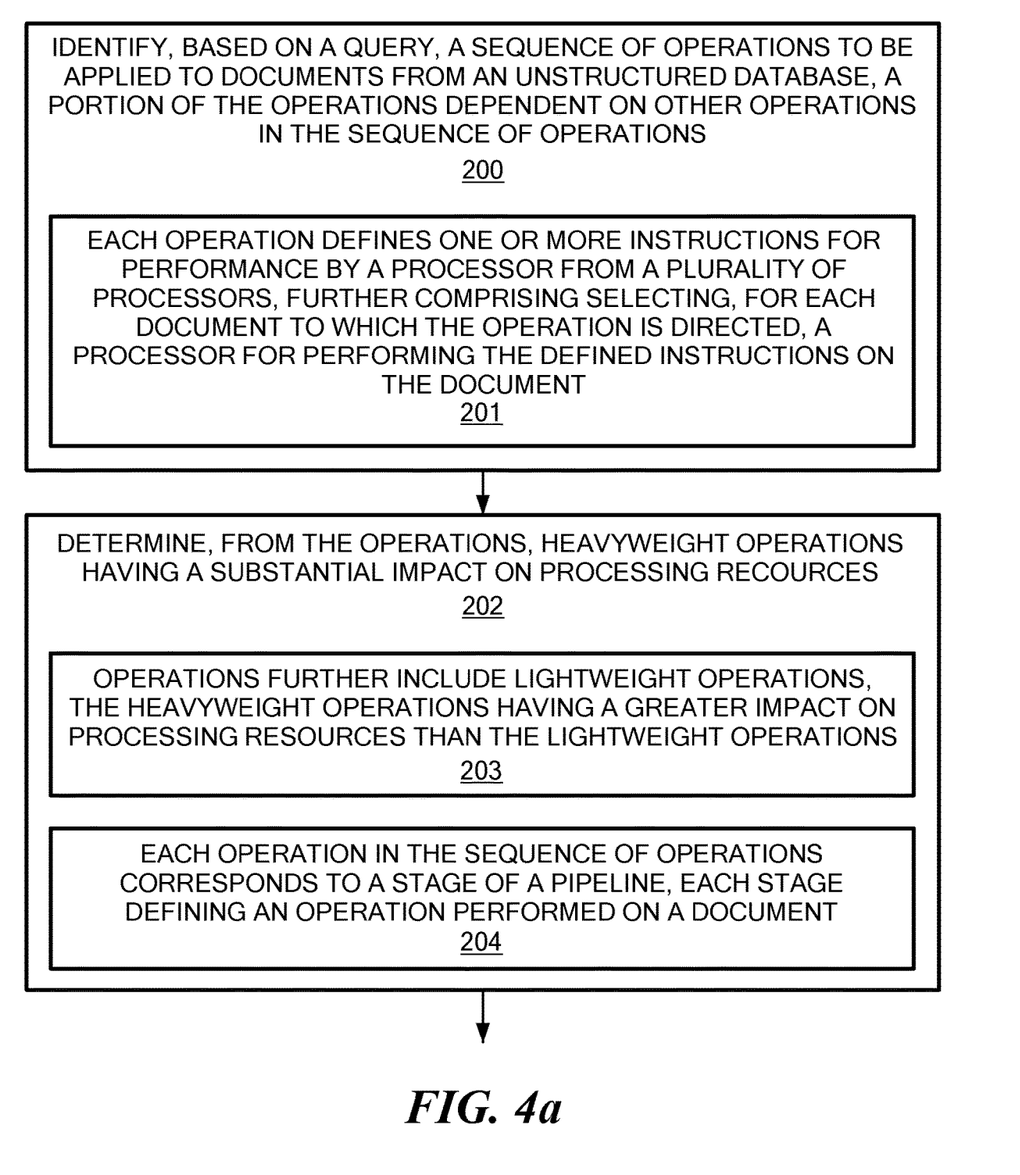
FIGS. 4a and 4b are a flowchart of pipeline processing in the pipeline of FIG. 2.
Figure 4B:
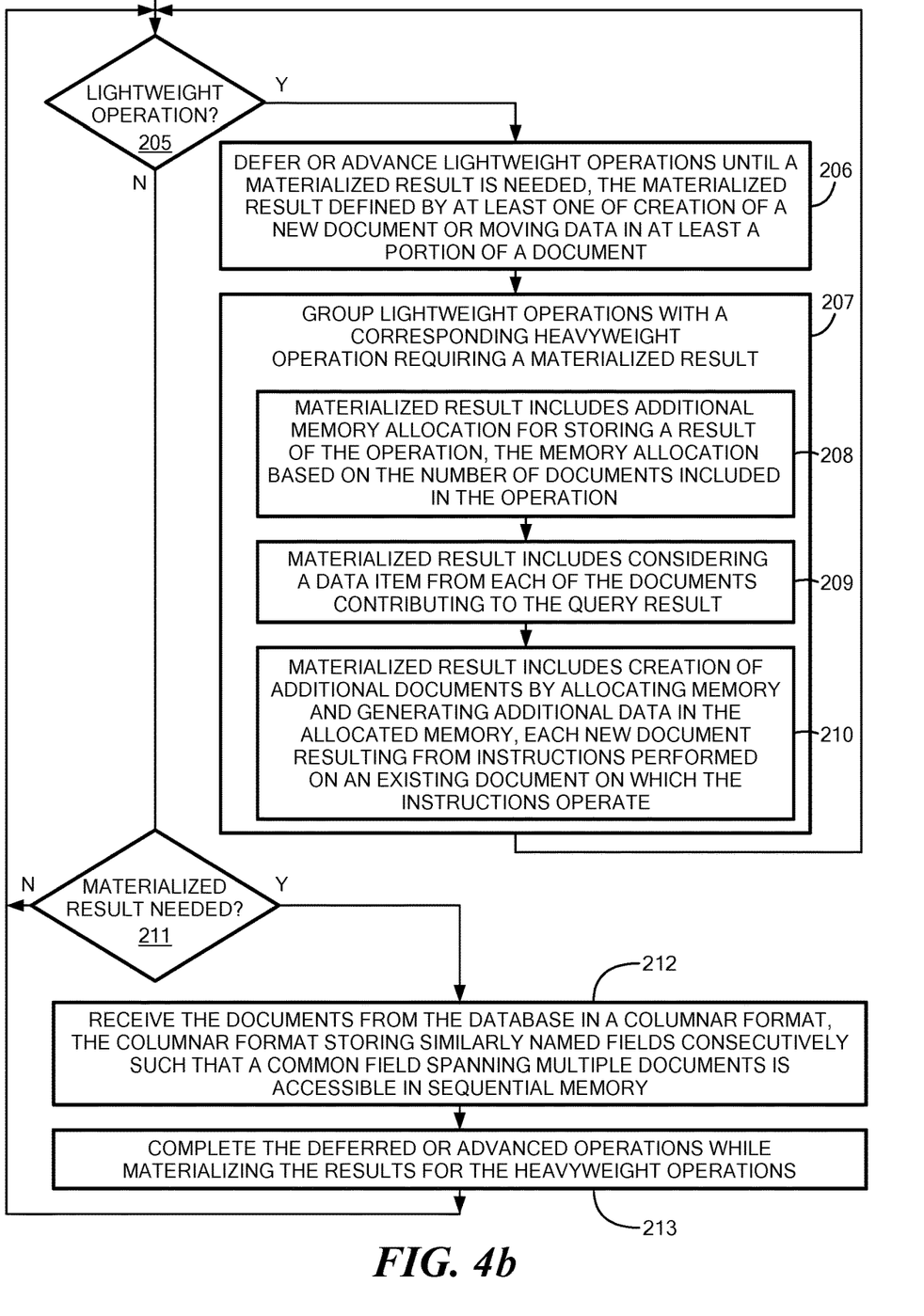

FIGS. 4a and 4b are a flowchart of pipeline processing in the pipeline of FIG. 2. Referring to FIGS. 2, 4a and 4b, at step 200, a method of generating a query result as disclosed herein includes identifying, based on a query, a sequence of operations to be applied to documents 132 from an unstructured database 124, in which a portion of the operations 170 may be dependent on other operations in the sequence of operations. Each pipeline 160 attempts to perform independent operations, that is, operations that can be performed with respect only to a current document, and not with respect to values in other documents 132 such as a sort or sum. Such operations may be performed asynchronously with operations 170 being performed by the other processors 152 and pipelines 160. Each operation 170 defines one or more instructions 172 for performance by a processor 152 from a plurality of processors by selecting, for each document 132 to which the operation is directed, a processor for performing the defined instructions 172 on the document 132, as depicted at step 201.

The server 150 determines, from the operations 172, heavyweight operations based on the dependencies, in which the heavyweight operations have a substantial impact on processing resources, as depicted at step 202. Heavyweight operations are such because they either require allocation of memory or creation of documents, or because they depend on an operation being performed by another professor, or both. In the example shown, the operations 170 further include lightweight operations, such that the heavyweight operations are defined as having a greater impact on processing resources than the lightweight operations, as clarified at step 203. Each operation 170 in the sequence of operations corresponds to a stage 162 of a pipeline 152, in which each stage 162 defines an operation 170 performed on a document 132, as shown at step 204.

A check is performed, at step 205, to determine if the operation is a lightweight operation. The check at step 205 provides for ordering, by advancing or deferring the lightweight operations until a materialized result is needed, in which he materialized result is defined by at least one of creation of a new document or moving data in at least a portion of a document, as disclosed at step 206. The sequencer 182 groups lightweight operations with a corresponding heavyweight operation requiring a materialized result, as depicted at step 207 The materialized result is defined by additional memory allocation for storing a result of the operation 170, where the memory allocation is based on the number of documents 132 included in the operation, as depicted at step 208. This may include determining operations that impact processing resources from performance based on a non-linear function of the number of documents in the database. In particular, functions in which the non-linear function is an exponential function can result in an O(n^2) computability which is highly detrimental in large data sets. Such materialized results generally include considering a data item from each of the documents contributing to the query result, as depicted at step 209. The materialized result may also include creation of additional documents 132 by allocating memory and generating additional data in the allocated memory, in which each new document results from instructions performed on an existing document 132 on which the instructions operate, as disclosed at step 210. In general, materialization operations require output allocation based on each document, and accordingly become computationally intensive with a large number of documents.

Following the ordering of the lightweight operations by grouping with the heavyweight operations, a check is performed at step 211 to determine if a materialized result is needed from execution of a heavyweight operation. In a particular configuration, the instruction sequence is scanned for lightweight operations and assignment to a corresponding heavyweight operation prior to commencing the heavyweight operations, but the level of advance look-ahead may differ.

Upon invocation of a heavyweight operation, the server 150 receives the documents 132 from the database 124 in a columnar format, in which the columnar format stores similarly named fields consecutively such that a common field spanning multiple documents is accessible in sequential memory, as depicted at step 212. The pipelines 160 then perform the instructions 172 directed to each of the documents 132 on the commonly named field stored in the sequential memory 168. Storage in columnar format implies that each of like named fields are fetched across multiple documents (records), so that instructions directed to only one or two fields may fetch just those fields without loading in each document in entirety. In other words, all the "name" fields may be read in, followed by all the "rate" fields, without requiring fetching of the extraneous fields that are not needed, read or modified. Processing then continues at step 213 to complete the deferred or advanced operations while materializing the results for the heavyweight operations.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of generating a query result, comprising:

identifying, based on a query, a sequence of operations to be applied to documents from an unstructured database;

determining, from the operations in the sequence of operations, heavyweight operations, the heavyweight operations having a substantial impact on processing resources, the remaining operations of the sequence of operations being lightweight operations;

grouping the operations in the sequence of operations, for each lightweight operation in the sequence of operations, by identifying a heavyweight operation to group the lightweight operation with based on determining if the lightweight operation has a dependency on an output of the identified heavyweight operation, deferring or advancing the lightweight operation in the sequence to correspond to a materialized result from invocation of the identified heavyweight operation by:

defining a pipeline entry corresponding to the identified heavyweight operation, and assigning a pipeline entry for the lightweight operation to correspond to the identified heavyweight operation, the materialized result defined by at least one of creation of a new document or moving data in at least a portion of a document; and completing the deferred or advanced lightweight operation when generating the materialized result of the corresponding heavyweight operations by performing the lightweight operation subsequent to the corresponding heavyweight operation on which it depends, the lightweight operations advanced or deferred to the pipeline entry of the corresponding heavyweight operation when the lightweight operation can be completed during the heavyweight operation by performing the lightweight operation on a same document or set of documents while the document or set of documents reside in memory for processing by the corresponding heavyweight operation.

2. The method of claim 1 further comprising ordering the operations in the sequence of operations such that multiple operations operate on the same document for generating a single materialized result from the multiple operations.

3. The method of claim 2 wherein the materialized result includes additional memory allocation for storing a result of the operation, the memory allocation based on a number of documents from the unstructured database included in the identified heavyweight operation.

4. The method of claim 2 wherein the materialized result includes considering a data item from each of the documents contributing to the query result.

5. The method of claim 2 wherein determining operations that impact processing resource includes identifying operations having performance based on a non-linear function of a number of documents from the unstructured database.

6. The method of claim 2 wherein deferring or advancing includes:

determining, for the heavyweight operations, lightweight operations to group with the heavyweight operations, and performing the grouped lightweight operations with the heavyweight operations.

7. The method of claim 1 wherein performing the lightweight operation assigned a pipeline entry further comprises:

setting an indicator corresponding to the lightweight operation and the corresponding heavyweight operation;

examining the indicator during performance of the corresponding heavyweight operation on a document; and performing, based on the indicator, the lightweight operation on the document before performing the corresponding heavyweight operation on other documents.

8. The method of claim 1 wherein grouping the operations in the sequence of operations include analyzing the operations in the sequence of operations to identify when multiple operations can be collapsed into a single operation that act upon the data together.

9. The method of claim 1 wherein each operation in the sequence of operations defines one or more instructions for performance by a processor from a plurality of processors, further comprising selecting, for each chunk of documents to which a respective operation is directed, a processor for performing the defined instructions on the document.

10. The method of claim 1 further comprising:

receiving the documents from the unstructured database in a columnar format, the columnar format storing similarly named fields consecutively such that a common field spanning multiple documents is accessible in sequential memory; and performing the operations in the sequence of operations directed to each of the documents on the commonly named field stored in the sequential memory.

11. The method of claim 10 wherein the materialized result includes creation of additional documents by allocating memory and generating additional data in the allocated memory, each new document resulting from instructions performed on an existing document on which the instructions operate.

12. The method of claim 1 wherein the documents have a nested syntax structure indicative of field names and field values.

13. The method of claim 12 wherein the documents further comprise a first document and a second document, the first document having a different set of fields than the second document.

14. The method of claim 1 further comprising grouping the lightweight operations and heavyweight operations based on whether the lightweight operations and heavyweight operations operate on a same document.

15. A processing server for generating query results, comprising:

a query interface for identifying, based on a received query, one or more operations from a sequence of operations to be applied to documents from an unstructured database, a portion of the operations dependent on other operations in the sequence of operations;

at least one processor configured to determine, from the operations in the sequence of operations, heavyweight operations having a substantial impact on processing resources based on a materialized result, the remaining operations in the sequence of operations being lightweight operations;

a plurality of pipelines configured to defer or advance the lightweight operations by associating the lightweight operations with a heavyweight operation for performance when a materialized result is needed from an invocation of the associated heavyweight operation by grouping the lightweight operations in the sequence of operation, for each lightweight operation in the sequence of operations, by:

identifying a heavyweight operation to group the lightweight operation with;

defining a pipeline entry corresponding to the heavyweight operation; and assigning the lightweight operation to a pipeline entry for a corresponding heavyweight operation, the materialized result defined by at least one of creation of a new document or moving data in at least a portion of a document, each of the pipeline entries adapted to complete the lightweight operation only after performing the other operations, from the sequence of operations, that the heavyweight operations depend on, the lightweight operation advanced or deferred to the pipeline entry of the corresponding heavyweight operation when the lightweight operation can be completed during the heavyweight operation by performing the lightweight operation on a same document or set of documents while the document or set of documents reside in memory for processing by the corresponding heavyweight operation.

16. The server of claim 15 further comprising a sequencer operable for:

ordering the operations in the sequence of operations such that multiple operations operate on the same document for generating a single materialized result from the multiple operations;

determining, for the heavyweight operations, lightweight operations to group with the heavyweight operations, and performing the grouped lightweight operations with the heavyweight operations.

17. The server of claim 16 wherein deferring or advancing includes:

determining, for the heavyweight operations, lightweight operations to group with the heavyweight operations, and performing the grouped lightweight operations with the heavyweight operations.

18. The server of claim 16 wherein the materialized result includes at least one of additional memory allocation for storing a result of the operation, the memory allocation based on a number of documents from the unstructured database included in the identified heavyweight operation, and considering a data item from each of the documents contributing to the query result.

19. The server of claim 15 wherein performing the lightweight operation assigned a pipeline entry further comprises:

setting an indicator corresponding to the lightweight operation and the corresponding heavyweight operation;

examining the indicator during performance of the corresponding heavyweight operation on a document; and performing, based on the indicator, the lightweight operation on the document before performing the corresponding heavyweight operation on other documents.

20. A computer program product on a non-transitory computer readable storage medium having instructions that, when executed by a processor, perform a method of generating a query result, comprising:

identifying, based on a query, a sequence of operations to be applied to documents from a database;

determining, from the operations in the sequence of operations, heavyweight operations having a materialized result, the materialized result having the greatest impact on processing resources and the remaining operations in the sequence of operations being lightweight operations;

grouping the operations in the sequence of operations, for each lightweight operation in the sequence of operations, by identifying a heavyweight operation to group the lightweight operation with based on determining if the lightweight operation has a dependency on an output of the identified heavyweight operation;

deferring or advancing the lightweight operation having the dependency on the output of the identified heavyweight operation until the materialized result is needed, the materialized result defined based on storage allocation performed by the heavyweight operation; and invoking a pipeline for performing the deferred or advanced lightweight operations together with a heavyweight operation generating the materialized result, including:

defining a pipeline entry corresponding to the heavyweight operation, and assigning a pipeline entry for the lightweight operation to a corresponding heavyweight operation, the materialized result defined by at least one of creation of a new document or moving data in at least a portion of a document;

completing the deferred or advanced operations when generating the materialized result of one of the heavyweight operations by performing the lightweight operation subsequent to the corresponding heavyweight operation on which it depends, the lightweight operations advanced or deferred to the pipeline entry of the corresponding heavyweight operation when the lightweight operation can be completed during the heavyweight operation by performing the lightweight operation on a same document or set of documents while the document or set of documents reside in memory for processing by the corresponding heavyweight operation.

* * * * *

UNITED STATES PATENT AND TRADEMARK OFFICE
CERTIFICATE OF CORRECTION

PATENT NO. : 10,642,876 B1
APPLICATION NO. : 14/712211
DATED : May 5, 2020
INVENTOR(S) : Ron Ben-Natan and Ury Segal It is certified that error appears in the above-identified patent and that said Letters Patent is hereby corrected as shown below:

Column 11, Line 61, after "instructions" delete --on the document--

Signed and Sealed this
Twenty-seventh Day of October, 2020

Andrei Iancu
*Director of the United States Patent and Trademark Office*